United States Patent [19]

Grabhoefer et al.

[11] Patent Number: 4,508,774
[45] Date of Patent: Apr. 2, 1985

[54] CELLULAR, MOLDED POLYURETHANE PARTS, PROCESS FOR THEIR PREPARATION BY THERMOFORMING OF POLYESTER-URETHANE FOAM AND THEIR USE

[75] Inventors: Herbert Grabhoefer, Limburgerhof; Otto Volkert, Weisenheim, both of Fed. Rep. of Germany

[73] Assignee: BASF Aktiengesellschaft, Ludwigshafen, Fed. Rep. of Germany

[21] Appl. No.: 588,888

[22] Filed: Mar. 12, 1984

[51] Int. Cl.$^3$ ............................................. C08G 18/14
[52] U.S. Cl. .................................... 428/220; 264/321; 428/318.8; 428/319.3; 428/319.7; 428/319.9; 521/50; 521/51
[58] Field of Search ................... 521/51, 50; 428/220, 428/318.8, 319.3, 319.7, 319.9; 264/321

[56] References Cited

U.S. PATENT DOCUMENTS

| | | | |
|---|---|---|---|
| 3,400,196 | 9/1968 | Le Roy | 428/311.5 |
| 3,740,283 | 6/1973 | Maxey | 428/304.4 |
| 4,059,660 | 11/1977 | Roth et al. | 264/46.4 |
| 4,119,749 | 10/1978 | Roth et al. | 428/99 |
| 4,129,697 | 12/1978 | Schäpel et al. | 521/176 |
| 4,241,131 | 12/1980 | Bailey | 264/257 |

FOREIGN PATENT DOCUMENTS 1411958 10/1973 United Kingdom .

*Primary Examiner*—Maurice J. Welsh
*Attorney, Agent, or Firm*—William G. Conger; Joseph D. Michaels

[57] ABSTRACT

A cellular polyurethane having a density of from 15 Kg/m$^3$ to 400 Kg/m$^3$ obtained by means of thermoforming, in a forming tool, at a compression factor of from 1 to 10 and temperatures of from 140° C. to 200° C., polyester-urethane foams having a density of from 15 Kg/m$^3$ to 40 Kg/m$^3$ which are based on aromatic polyisocyanates and polyester polyols. The resulting polyurethane shaped objects are suitable for use as self-supporting trim panels, headliners, engine compartment covers, or instrument panels in the automotive, aircraft or railway industries.

13 Claims, 1 Drawing Figure

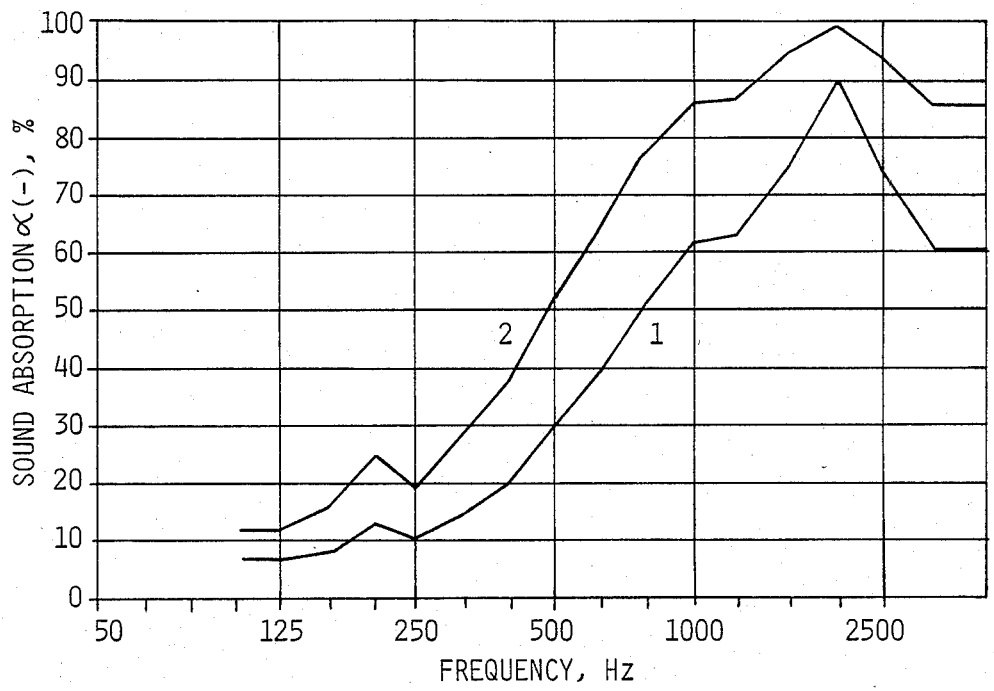

CELLULAR, MOLDED POLYURETHANE PARTS, PROCESS FOR THEIR PREPARATION BY THERMOFORMING OF POLYESTER-URETHANE FOAM AND THEIR USE

BACKGROUND OF THE INVENTION

1. Field of the Invention

The present invention relates to thermoformed cellular polyurethane. More particularly, the invention relates to the formation of shaped polyurethane parts, especially panels, by the thermoforming compression of polyester-urethane foams. The resulting shapes and panels are advantageously used in the railway, automotive, and aircraft industry as headliners, trim panels, engine compartment covers, and the like.

2. Description of the Prior Art

Formed sheets such as trim panels, headliners, and vehicle trim have exhibited great utility in the automotive, aircraft, and railway industries. As described in German Pat. No. 2,602,839 (U.S. Pat. No. 4,059,660 and U.S. Pat. No. 4,119,749), such sheets may be formed by laminating smooth sided corrugated paper with a foam layer, for example, a layer of polyurethane foam. An adhesive is utilized to adhere the various layers following which the components are bonded together under pressure at room temperature and formed to the desired shape. The preparation of these sheets is highly labor-intensive and is unsuitable for large-scale production.

Reversibly thermoformable fiber-reinforced rigid polyurethane plastics may be prepared according to German Pat. No. 2,164,381 (Great Britain Pat. No. 1,411,958) by incorporating inorganic or organic fibers in a partially reacted polyurethane system which is liquid up to 50° C., containing primarily bifunctional polyols having hydroxyl numbers from 100 to 600, and modified polyisocyanates or polymeric diphenylmethane-diisocyanates. The disadvantage of this two-step process is that the fiber reinforcing material, whether woven or non-woven, must first be coated with a flowable polyurethane reaction mixture followed by curing in a closed mold at temperatures over 120° C. The flat sheets produced in this manner can then be thermoformed at temperatures from 130° C. to 220° C. However, this cost-intensive process also limits the rate at which molded parts may be produced to a low number of parts per unit time.

German Pat. No. 2,607,380 (U.S. Pat. No. 4,129,697) describes the preparation of thermoformable polyisocyanurate foams by reacting polyether polyols, glycols, and diphenylmethane diisocyanate, which can contain up to 20 weight percent closely related polyisocyanates of higher molecular weight. Expansion takes place in heated molds or on conveyors, whereby the foams are post cured or tempered for approximately 15 minutes at 80° C. One of the disadvantages of this process is that the polyisocyanurate foams are brittle, do not exhibit internal cushioning, and are poor sound absorbers. Moreover, polyisocyanurate slab foams cannot generally be produced with slab thicknesses greater than 50 cm since otherwise foam core discoloration can occur.

It is difficult or even impossible to use in-mold foaming to produce flat structures with wall thicknesses from 1 mm to 6 mm suitable for trim panels, headliners, engine compartment covers, since this would lead to very high gross densities. In addition, it is extremely difficult to completely and uniformly fill molds having complicated shapes with relatively high-viscosity polyurethane mixtures. If this were possible at all, very high pressure would be required.

The object of this invention is to prepare cellular, self-supporting, polyurethane shaped objects, having large surface area and low densities, whereby said objects may be produced economically at high volume. The polyurethane shaped objects should possess a high degree of sound absorption, good thermal insulation properties, high flame resistance and the ability to recover from compression loads. Polyurethane foams suitable for use as the initial components ought not to exhibit core discoloration or scorching.

SUMMARY OF THE INVENTION

The subject invention relates to cellular polyurethanes having a density of from 15 $Kg/m^3$ to 400 $Kg/m^3$ which are produced by thermoforming polyurethane foams having a density of from 15 $Kg/m^3$ to 40 $Kg/m^3$, and which are based on aromatic polyisocyanates and predominately polyester polyols. The thermoforming process takes place in a forming tool at a compression factor of from 1 to 10 at temperatures from 140° C. to 200° C.

The thermoforming of flexible, semi-rigid, and rigid polyurethane foams having densities up to 40 $Kg/m^3$ represents a useful addition to in-mold foaming and can be used in many cases where conventional methods of producing shaped parts are unavailable. This process can also be used to produce self-supporting shaped parts with complicated shapes, large surface area, and low densities which remain true to contour and which may be produced at high part rates.

DESCRIPTION OF THE PREFERRED EMBODIMENTS

In order to produce the cellular thermoformed polyurethane shaped objects of the invention, it is necessary that the selected starting polyol component comprise polyester polyols, possibly mixed with no more than 45 weight percent polyether polyols based on the total weight of the polyol component, and the isocyanate component comprise a mixture of diphenylmethane diisocyanates and polyphenyl-polymethylene polyisocyanates, subsequently referred to as polymeric MDI. This system can be used to continuously produce flexible, semi-rigid, or rigid polyurethane slab foams on conventional slab foam equipment, or discontinuously in open molds. These slab foams exhibit densities of 15 $Kg/m^3$ to 40 $Kg/m^3$, preferably 20 $Kg/m^3$ to 38 $Kg/m^3$, are thermoformable, and possess the desired mechanical properties, e.g., cushioning, recoverability, hydrolysis resistance, sound absorption capabilities, etc.

Suitably dimensioned foam, corresponding in size to the shaped object which is to be produced, are cut from the resulting polyurethane foam slabs. The initial slabs can have dimensions up to 1 m×2 m×60 m. The cut slabs must be as free as possible from scrap and dust, must be able to be split into foam sheets having a thickness of from 2 mm to 20 cm, preferably from 2 mm to 10 cm, and more preferably from 5 mm to 25 mm. Standard industrial splitting equipment is suitable, while oscillating hot-wire slicers are preferred in actual practice. It must be cautioned that the larger size foam sheets must exhibit sufficiently high mechanical stability to be able to withstand being transported without damage.

In order to produce the polyurethane thermoformed objects of the invention, the foam sheets which, as already stated, have densities of from 15 Kg/m³ to 40 Kg/m³, preferably from 20 Kg/m³ to 38 Kg/m³, are thermoformed at temperatures from 140° C. to 200° C., preferably 150° C. to 180° C., at a compression factor of from 1 to 10, preferably from 2 to 10, in forming or stamping tools. Relatively high degrees of compression must be utilized if polyurethane shaped objects which have a cellular foam core and an outer margin of higher density are to be produced. Compression factors of greater than 2, preferably from 3 to 8, are suitable. According to the invention, the compression factor is defined as for foam expansion in closed molds, as the quotient of the density of the produced cellular polyurethane shaped object divided by the density of the initially utilized polyurethane foam. A compression factor of 6, for example, may be illustrated by compressing a foam sheet having a density of 20 Kg/m³ to form a shaped object having a density of 120 Kg/m³.

The thermoforming of the polyurethane foam sheets at from 140° C. to 200° C. can be accomplished in various ways. In one version, the polyurethane foam sheets are heated to their deformation temperature with the aid of infrared radiators, hot air ovens, contact hot plates or other heating means. The heated foam sheets are then placed in the forming tool maintained either at room temperature or moderately heated, for example to 60° C., and are formed therein without the application of pressure (compression factor 1) or, preferably, with pressure. The advantage of this method is that the molding tools can be made of economical materials such as ceramics, gypsum, wood, or plastics, e.g., unsaturated polyester or epoxy resins, and the resulting shaped objects can be demolded immediately.

In the preferred process, polyurethane foam sheets, preferably at room temperature, or moderately heated, are placed in a temperature controlled molding tool of metal, for example, steel or cast aluminum, heated to 140° C. to 200° C., and are formed therein over a period of from 30 seconds to 300 seconds, preferably from 30 seconds to 120 seconds, without pressure or preferably, under pressure, following which the resulting cellular polyurethane shaped object is demolded.

Of course, it is also possible to combine both methods to achieve extremely rapid thermoforming of foam sheets which have been preheated to 140° C. to 200° C. and have been placed in 140° C. to 200° C. forming tools. The polyurethane shaped objects of the invention, especially those with a cellular core of low density and a skin of higher density, can be used directly for industrial purposes such as sound insulation or as engine compartment covers.

If desired, the foam sheets can also be provided on one or both sides with reinforcing or decorative coverings at the same time the thermoforming operation occurs in the molding tools. To accomplish this, these optional materials are placed in the molding tool and are bonded to the polyurethane foam under pressure with the aid of spray, laminating, or hot-melt adhesives. It is especially noteworthy that wood or sawdust-filled polypropylene exhibits a high bonding strength with the polyester-based polyurethane foam, even without the addition of adhesives.

Typical reinforcing or decorative coverings, which may be optionally pigmented or printed, comprise woven or nonwoven materials of glass, carbon, plastics, or textile fibers; metal foils, for example, aluminum, copper, brass, gold, or steel up to 0.3 mm thick; polymers such as polyvinyl chloride, acrylo-butadiene-styrene polymers, polyamide, polyester, polyethylene, polypropylene, sawdust-filled polypropylene, cellulose esters, and cellulose mixed esters; and cardboard or paper.

In a preferred embodiment of the invention the cover layers may be partially cured prepregs of unsaturated polyester resins, which are then fully cured during thermoforming at temperatures from 140° to 200° C. Such prepregs are preferably 1 to 5 mm thick and in addition to the unsaturated polyester resin, contain the usual monomers, for example, styrene; reinforcing materials, e.g., glass fibers; fillers, e.g., chalk; thickeners, e.g., magnesium oxide; and possibly polymeric additives, e.g., diene rubbers; as well as conventional inhibitors, peroxides, and release agents. The cellular polyurethane shaped objects in accordance with the invention are prepared exclusively from thermoformable flexible, semi-rigid, or rigid polyurethane foams based on polyester polyols or mixtures of polyester and polyether polyols, and polymeric MDI, or, in some cases, modified polymeric MDI, whereby the semi-rigid blends are preferred due to their excellent deadening and recovery properties.

Polyester polyols having a functionality from 2 to 4, preferably from 2.3 to 4.0, and hydroxyl numbers from 45 to 380, preferably from 50 to 220, are preferred as starting components for the polyurethane foams which can be used in accordance with the invention. Hydroxyl numbers of from 50 to 80 are generally used for the preparation of flexible foams, hydroxyl numbers of 85 to 150 are used for the preparation of semi-rigid foams, and hydroxyl numbers of from 150 to 380 are preferable for the rigid foams.

The polyester polyols can be prepared using known methods, for example, by condensation polymerization at temperatures from 100° C. to 250° C., preferably from 130° C. to 220° C., in some cases in the presence of esterification catalysts such as organic compounds of titanium, vanadium, or tin. Inert solvents or water entrainers such as benzene toluene, xylene, or chlorobenzene may be utilized for the azeotropic distillation of water of condensation, preferably under reduced pressure. Suitable monomers include dicarboxylic acids, preferably aliphatic dicarboxylic acids having from 4 to 6 carbon atoms in the alkylene residue, and polyfunctional alcohols, preferably diols. Some typical aliphatic dicarboxylic acids are glutaric acid, pimelic acid, sebacic acid, and, preferably, adipic acid and mixtures of succinic acid, glutaric acid, and adipic acid, and aromatic dicarboxylic acids such as phthalic acid. In addition, lesser amounts of high molecular weight monocarboxylic acids such as fatty acids may be used. Examples for di- and polyfunctional alcohols, in particular difunctional alcohols, are: ethylene glycol, diethylene glycol, 1,3-propylene glycol, dipropylene glycol, 1,4-butylene glycol, 1,5-pentamethylene glycol, 1,6-hexamethylene glycol, glycerine, and trimethylolpropane. Diethylene glycol, 1,3-propylene glycol, mixtures of 1,4-butylene glycol, 1,5-pentamethylene glycol, and 1,6-hexamethylene glycol in weight ratios of from 10 to 30:40 to 60:15 to 35, glycerine, and trimethylolpropane are preferred. Especially preferred are polyester polyols based on adipic acid-diethylene glycol-glycerine; adipic acid-propylene glycol; adipic acid-ethylene glycol-diethylene glycol; mixtures of succinic, glutaric, and adipic acid-diethylene glycol-glycerine or trimethylolpropane;

adipic acid mixtures of 1,4-butylene, 1,5-pentamethylene, and 1,6-hexamethylene glycol; and, in particular, polyester polyols prepared from adipic acid-diethylene glycol-trimethylolpropane, adipic acid-phthalic acid-1,3-propylene glycol-trimethylolpropane, adipic acid-phthalic acid-oleic acid-trimethylolpropane, and adipic acid-glutaric acid-succinic acid-diethylene glycol and trimethylolpropane. The polyester polyols can be utilized individually or in the form of mixtures. Preferred are mixtures comprising (a) 20 parts to 85 parts, preferably 20 parts to 60 parts, by weight, of a polyester polyol of adipic acid-diethylene glycol-trimethylolpropane, (b) 10 parts to 20 parts, preferably 10 parts to 30 parts, by weight, of a polyester polyol comprising adipic acid-phthalic acid-1,3-propylene glycol-trimethylolpropane, and/or (c) from 5 parts to 80 parts, preferably 5 parts to 30 parts, by weight, of a polyester polyol comprising adipic acid-phthalic acid-oleic acid-trimethylolpropane, or mixtures comprising (d) 50 parts to 95 parts, preferably 60 parts to 90 parts, by weight, of a polyester polyol comprising adipic acid-diethylene glycol-trimethylolpropane, and (e) 5 parts to 50 parts, preferably 10 parts to 40 parts, by weight, of a polyester polyol comprising adipic acid-glutaric acid-succinic acid-diethylene glycol-trimethylolpropane.

The polyester polyols which can be utilized in accordance with the invention exhibit viscosities of approximately 6000 mPa.s to 30,000 mPa.s, preferably 10,000 mPa.s to 25,000 mPa.s, at 25° C.

In order to prepare polyurethane foams having special mechanical properties, the polyester polyols can also be mixed with lesser amounts of conventional polyether polyols. Suitable polyester-polyether polyol mixtures, must be comprised of at least 55 percent by weight of the aforementioned polyester polyols, preferably from 60 percent to nearly 100 percent by weight polyester polyol based on the total weight.

Mixtures of diphenylmethane diisocyanates and polyphenyl-polymethylene polyisocyanates (polymeric MDI) having a diphenylmethane diisocyanate isomer content of from 40 to 85 weight percent, preferably from 40 to 65 weight percent, and more preferably from 40 to 55 weight percent, are used as the aromatic polyisocyanates. Also suitable is polymeric MDI modified by the presence of carbodiimide groups and/or, preferably, urethane groups. In addition, for special applications, it may be desirable to incorporate lesser amounts, for example, up to a maximum of 10 weight percent, based on the polymeric MDI, of carbodiimide- and/or urethane-modified 4,4'- and/or 2,4'-diphenylmethane diisocyanate.

Preferably, thermoformable polyurethane slab foams are prepared without the use of chain extenders or cross-linking agents. Depending on the mechanical properties which are desired for the polyurethane foams, however, the addition of chain extenders or cross-linking agents having molecular weights of from 60 to 300 can produce desirable results. Aliphatic diols having from 2 to 6 carbon atoms are suitable for this purpose, for example, ethylene glycol, 1,4-butylene glycol, and 1,6-hexamethylene glycol. Triols are also suitable, for example, glycerine and trimethylolpropane, alkanolamines such as ethanolamine, dialkanolamines such as diethanolamine and trialkanolamines such as triethanolamine and triisopropanolamine. The co-utilization of triisopropanolamine with one or more of the above-mentioned chain extending or cross-linking agents is preferred. The weight ratio of the chain extender or cross-linking agent to the polyester polyol depends on the mechanical properties desired in the final product and can range from 0 to 10 weight percent, preferably from 0 to 5 weight percent based on the polyester polyol weight.

Water, which reacts with isocyanate groups to form carbon dioxide, is among the blowing agents which may be used to prepare the polyurethane foam. Preferred amounts of water which can be used are from 0.01 to 5 weight percent, preferably from 2 to 4 weight percent based on the polyester polyol weight.

Other blowing agents which can be used, and which may be used in addition to, or to the exclusion of water, are liquids with low boiling points which evaporate as a result of the exothermic polyaddition reaction. Suitable liquids are those which are inert relative to the organic polyisocyanates and whose boiling points are not greater than 100° C. at atmospheric pressure, and which preferably range from −40° to +50° C. Examples of such preferably used liquids are: halogenated hydrocarbons such as methylene chloride, trichlorofluoromethane, dichlorodifluoromethane, dichloromonofluoromethane, dichlorotetrafluoroethane, and 1,1,2-trichloro-1,2,2-trifluoroethane. Mixtures of these low-boiling-point liquids together and/or with other substituted or unsubstituted hydrocarbons can also be used.

The most desirable amount of low-boiling-point liquid to be used to prepare the polyurethane foams depends on the desired density as well as on the amount of water used. In general, amounts from 0.1 to 20 weight percent, preferably from 5 to 15 weight percent based on the weight of the polyester polyol offer good results. Best results are obtained when mixtures of water and trichlorofluoromethane are used as the blowing agent.

In addition, catalysts may be incorporated in the reaction mixture to accelerate the formation of polyurethane, and auxiliaries and additives generally used to produce polyurethane foams can also be incorporated. Such substances include, for example, surfactants, flame retardants, reinforcing agents, porosity control agents, antioxidants, agents to protect against hydrolysis, colorants, pigments, fillers, and other additives.

Suitable catalysts for accelerating the reaction between the polyester polyols and, in some cases, the chain extenders, water, and the organic polyisocyanates are, for example: tertiary amines such as dimethylbenzylamine, N,N,N',N'-tetramethyldiaminoethylether, bis(dimethylaminopropyl)urea, N-methyl- or N-ethylmorpholine, dimethylpiperazine, 1,2-dimethylimidazole, 1-aza-bicyclo-[3.3.0]-octane and, preferably triethylenediamine and 2-(dimethylaminoethoxy)ethanol, which are used in amounts from 0.1 to 30 weight percent, preferably from 0.5 to 25 weight percent based on the polyester polyol weight.

Surfactants can also be used, for example, to support the homogenization of the starting materials and, in some cases, to regulate the cell structure in the polyurethane foams. Typical examples are siloxane-oxyalkylene heteropolymers and other organic polysiloxanes, oxyethylated alkylphenols, oxyethylated fatty alcohols, paraffin oils, castor oil or castor oil acid esters and turkey red oil, which are used in amounts from 0.2 to 6 parts by weight per 100 parts by weight polyester polyol.

In order to improve the flame resistance of the polyurethane slab foams, fire retardance can be incorporated. Typical examples are phosphorous- and/or halogen-containing compounds such as tricresyl phosphate, tris[2-chloroethyl]phosphate, tris[chloropropyl]phosphate, and tris[2,3-dibromopropylene]phosphate; inorganic flame retardants such as antimony trioxide, arsenic oxide, ammonium phosphate, ammonium polyphosphates, ammonium sulfate, etc.; as well as cyanic acid derivatives such as dicyandiamide, guanidine, guanidine salts, and melamine. In general, it has been found to be desirable to use from 5 to 50 parts by weight of the cited flame retardants for each 100 parts by weight of the polyester polyol.

Typical reinforcing materials are: carbon fibers, glass beads, and, preferably, glass fibers and glass fiber powder. Such reinforcing materials can be incorporated in the expandable polyurethane mixture in amounts up to 25 weight percent based on the polyester polyol weight.

Additional information on the other standard auxiliaries and additives cited above can be found in the literature, for example, in the monograph by J. H. Saunders and K. C. Frisch, "High Polymers," Vol. XVI, *Polyurethanes*, pp. 1 and 2, Interscience Publishers, 1962, 1964.

In order to prepare the polyurethane slab foams, the organic polyisocyanates and polyester polyols or mixtures of polyester polyols and, in some cases, polyether polyols and/or chain extenders are reacted in such amounts that the OH-:NCO-group ratio is from 1:(0.7–1.3), preferably from 1:(0.8–1.1). The preferred method of preparing flexible polyurethane foams utilizes OH-:NCO-group ratios of from 1:(0.8–0.95), while the preferred method for semi-rigid polyurethane foams uses OH-:NCO-group ratios of from 1:(0.95–1.05) and the method for rigid polyurethane foams uses OH-:NCO-group ratios of from 1:(1.05–1.1).

Preferably, the polyurethane foams are prepared utilizing the one-shot process, either continuously on slab foam equipment forming large foam slabs, or discontinuously in open molds. When using a mixing chamber with several feed nozzles, the starting components may be fed in separately for vigorous mixing in the mixing chamber. It has been found to be particularly advantageous to work with a three-component system, whereby the polyester polyols or mixtures of polyester polyols, polyether polyols and/or diols are used as the A component, the polymeric or modified MDI is used as the B component, and a premix comprising blowing agents, catalysts, and, possibly, chain extenders or cross-linking agents, auxiliaries, and/or additives is used as the C component. Here, depending on the initial components used, it may be desirable to add a low-viscosity polyether polyol having a functionality of from 2 to 3 and a hydroxyl number of from 30 to 85 as a solubilizing agent in component C. Said solubilizing agent can be added in amounts ranging up to 45 weight percent based on the total weight of the blowing agent, catalyst and chain extenders, auxiliaries, and additives.

In order to prepare the polyurethane slab foams, the described starting substances are vigorously mixed in the aforementioned ratios at temperatures from 15° C. to 60° C., preferably from 20° C. to 35° C., and then the reaction mixture is allowed to expand in open, optionally temperature-controlled, molds.

The resulting thermoformable polyurethane foams having densities from 15 to 40 Kg/m$^3$ possess, depending on the selection of the polyester polyol and the OH-:NCO-equivalency ratios, superior physical properties such as resistance to hydrolysis, formability, cushioning ability and recovery, and thermal insulation and sound absorption capabilities.

The thermoformed cellular polyurethane shaped objects prepared in accordance with the invention have densities from 15 Kg/m$^3$ to 400 Kg/m$^3$, preferably from 20 Kg/m$^3$ to 80 Kg/m$^3$. The low-density shaped objects in particular, for example those having densities up to 40 Kg/m$^3$, have important commercial significance for increasing the "interior safety" in automotive and aircraft design. The polyurethane shaped objects are preferably used in the railway, automotive, and aircraft industries as headliners, door and wall trim panels, instrument panels, dashboards, and engine compartment covers. However, these products are also used in the furniture industry, audio and television design, and in the construction industry as protective materials to achieve sound absorption or thermal insulation.

The following polyester and polyether polyols are used to prepare the thermoformable polyurethane foams:

Polyester polyol I

A polyester polyol having a functionality of 2.6 and a hydroxyl number of 60, prepared by the condensation polymerization of adipic acid with diethylene glycol and trimethylolpropane.

Polyester polyol II

A polyester polyol having a functionality of 3.0 and a hydroxyl number of 215, prepared by the condensation polymerization of adipic acid, phthalic acid anhydride, 1,3-propylene glycol, and trimethylolpropane.

Polyester polyol III

A polyester polyol having a functionality of 3.8 and a hydroxyl number of 350, prepared by the condensation polymerization of adipic acid, phthalic acid anhydride, oleic acid, and trimethylolpropane.

Polyester polyol IV

A polyester polyol having a functionality of 2.6 and a hydroxyl number of 63, prepared by the condensation polymerization of a dicarboxylic acid mixture comprising 50 parts by weight adipic acid, 30 parts by weight glutaric acid, and 20 parts by weight succinic acid, with diethylene glycol and trimethylolpropane.

Polyether polyol I

A trifunctional polyether polyol having a hydroxyl number of 35 prepared by oxyalkylating glycerine with 1,2-propylene oxide and ethylene oxide in an 85:15 weight ratio.

Polyether polyol II

A tetrafunctional polyether polyol having a hydroxyl number of 480 prepared by oxyalkylating ethylenediamine with 1,2-propylene oxide.

Polymeric MDI

A mixture comprising approximately 50 parts by weight diphenylmethane diisocyanates and 50 parts by weight polyphenyl-polymethylene polyisocyanates.

EXAMPLE 1

Preparation of a semi-rigid, thermoformable polyurethane slab foam from the following starting components:

40 parts by weight polyester polyol I,
20 parts by weight polyester polyol II,
10 parts by weight polyester polyol III,
30 parts by weight polyether polyol I,
3.2 parts by weight triisopropanolamine,
1.7 parts by weight N,N-dimethylbenzylamine,
4.0 parts by weight water and
97.8 parts by weight polymeric MDI.

In the one-shot process the starting components are mixed together vigorously in a multiple-component mixing head at room temperature (23° C.) and are allowed to expand on a continual polyurethane slab line.

The following mechanical properties were measured in the resulting polyurethane foam:
Density per DIN 53 420: 38 kg/m$^3$
Heat distortion temperature under flexural load per DIN 53 424: 134° C.
Compression strength per DIN 53 421: 80 KPa
Flexural strength per DIN 53 423: 170 KPa
Tensile strength per DIN 53 455: 161 N/mm$^2$
Elongation per DIN 53 455: 17 percent

EXAMPLE 2

Preparation of a flexible, thermoformable polyurethane slab foam from the following starting components:
80 parts by weight polyester polyol I,
20 parts by weight polyester polyol IV,
1.2 parts by weight N,N-dimethylbenzylamine,
1.2 parts by weight foam stabilizer based on polytherpolysiloxane (Niax ® L 532, Union Carbide Corp.),
4.9 parts by weight water,
20.0 parts by weight monofluorotrichloromethane and
62.4 parts by weight polymeric MDI.

The starting components were mixed and expanded as described in Example 1 to form a polyurethane slab foam in which the following mechanical properties were observed:
Density per DIN 53 420: 20 kg/m$^3$
Tensile strength per DIN 53 571: 114 N/mm$^2$
Load at 40 percent compression per DIN 53 577: 3.5 k.Pa
Elongation per DIN 53 571: 68 percent

EXAMPLE 3

Preparation of a tough, rigid, flame-resistant, thermoformable polyurethane slab foam from the following starting components:
40 parts by weight polyester polyol I,
20 parts by weight polyester polyol II,
10 parts by weight polyester polyol III,
10 parts by weight polyether polyol II,
20 parts by weight ammonium polyphosphate,
10 parts by weight trichloroethyl phosphate,
3.2 parts by weight triisopropanolamine,
1.2 parts by weight dimethylbenzylamine,
4.0 parts by weight water, and
98.4 parts by weight polymeric MDI.

The starting components were mixed and expanded as described in Example 1 to form a polyurethane slab foam in which the following mechanical properties were observed:
Density per DIN 53 420: 40 kb/m$^3$
Heat distortion temperature under flexural load per DIN 53 424: 138° C.
Compression strength per DIN 53 421: 140 kPa
Flexural strength per DIN 53 423: 231 kPa
Flexural stress at conventional deflection per DIN 53 423: 229 kPa
Tensile strength per DIN 53 455: 202 N/mm$^2$
Elongation per DIN 53 455: 13 percent The polyurethane slab foam met the following fire resistance requirements:
per DIN 4201: B 2
per FAR 25.853 (a through l)
per UL 94 HF 1 and
per U.S.-FMVSS 302

The sound absorption efficiency $\alpha$-(−) as a function of frequency, f, exhibited the curve shown in the FIGURE for a foam sheet of density 40 kg/m$^3$ and thickness 17 mm in an impedance tube. Curve 1 was measured with the sound directed normal to the sheet while curve 2 was measured at a statistical angle of incidence.

EXAMPLE 4

The polyurethane slab foam prepared in accordance with Example 3 was cut into 20 mm-thick foam sheets. These sheets were heated slightly and compressed to a sheet thickness of 10 mm in a forming tool at 180° C. and at a pressure of 1.5 bar.

The following mechanical properties were observed in the resulting shaped objects:
Density per DIN 53 420: 80 kg/m$^3$
Flexural stress at conventional deflection per DIN 53 423: 376 k.Pa
Heat distortion temperature under flexural load per DIN 53 424: 138° C.
Tensile strength per DIN 53 455: 302 N/mm$^2$
Elongation per DIN 53 455: 16 percent

EXAMPLE 5

A polyurethane foam sheet of 10 mm thickness prepared from the polyurethane slab foam of Example 2 was heated, covered with a 2 mm-thick prepreg of an unsaturated polyester resin, and molded in a molding tool at 150° C.

The resulting cellular shaped sandwich was used as an engine compartment cover for an automotive application.

The embodiments of the invention in which an exclusive privilege or property is claimed are defined as follows:

1. A cellular polyurethane having a density of 15 Kg/m$^3$ to 400 Kg/m$^3$ prepared by: thermoforming in a molding device at a temperature of from about 140° C. to 200° C. and at a compression factor of from 1 to 10, a polyurethane foam having a density of from 15 Kg/m$^3$ to 40 Kg/m$^3$, wherein said polyurethane foam is prepared by reacting an isocyanate component comprising a member selected from the group consisting of;
 (a) polymeric MDI;
 (b) carbodiimide modified MDI;
 (c) urethane modified MDI; and
 (d) mixtures thereof,
with a polyol component selected from the group consisting of:
 (e) a polyester polyol mixture containing one or more polyester polyols; and
 (f) a polyester/polyether polyol mixture comprising one or more polyester polyols and one or more polyether polyols, provided that the polyester polyols comprise at least 55 percent by weight of said polyol component, in the presence of catalysts, blowing agents, and optionally chain extenders, cross-linking agents, additives, and auxiliaries.

2. The cellular polyurethane part as recited in claim 1 wherein said part comprises a cellular foam core and a skin of higher density.

3. The cellular polyurethane part as recited in claim 2, wherein a degree of compression of from 2 to 10 is used.

4. The cellular polyurethane part as recited in claim 1, wherein said polyurethane foam has a thickness of 2 mm to 20 cm.

5. The cellular polyurethane part as recited in claim 1, wherein coverings are applied to one or more sides of said polyurethane foam prior to thermoforming.

6. The cellular shaped polyurethane part as recited in claim 5, wherein said coverings comprise curable, unsaturated polyester prepregs.

7. The cellular polyurethane part as recited in claim 6, wherein said prepregs contain glass fibers or fillers.

8. The cellular polyurethane part as recited in claim 1, wherein said polyester polyol component has a functionality of from 2 to 6 and a hydroxyl number of from 45 to 250.

9. The cellular polyurethane part as recited in claim 1 wherein said polyester polyols are selected from the group consisting of:

(a) adipic acid-diethylene glycol-trimethylolpropane copolymers;

(b) adipic acid-phthalic acid-propylene glycol-trimethylolpropane copolymers;

(c) adipic acid, phthalic acid-oleic acid-trimetylolpropane copolymers;

(d) adipic acid-glutaric acid-succinic acid-diethylene glycol-trimethylol propane compolymers; and (e) mixtures of two or more of copolymers (a), (b), (c), or (d).

10. The cellular polyurethane part as recited in claim 8 wherein said polyester polyols are selected from the group consisting of:

(a) adipic acid-diethylene glycol-trimethylolpropane copolymers;

(b) adipic acid-phthalic acid-propylene glycol-trimethylolpropane copolymers;

(c) adipic acid, phthalic acid-oleic acid-trimethylolpropane copolymers;

(d) adipic acid-glutaric acid-succinic acid-diethylene glycol-trimethylol propane compolymers; and (e) mixtures of two or more of copolymers (a), (b), (c), or (d).

11. A cellular polyurethane self-supporting trim panel, headliner, engine compartment cover or instrument panel as recited in claim 1.

12. A cellular polyurethane self-supporting trim panel, headliner, engine compartment cover or instrument panel as recited in claim 6.

13. A cellular polyurethane self-supporting trim panel, headliner, engine compartment cover or instrument panel as recited in claim 7.

* * * * *

UNITED STATES PATENT AND TRADEMARK OFFICE
CERTIFICATE OF CORRECTION

PATENT NO. : 4,508,774
DATED : April 2, 1985
INVENTOR(S) : HERBERT GRABHOEFER and OTTO VOLKERT It is certified that error appears in the above-identified patent and that said Letters Patent is hereby corrected as shown below:

<u>First page</u>, <u>Bibliographic Data</u>, add Code 30 –
Foreign Application Priority Data – March 15, 1983

(DE) Fed. Rep. of Germany – 3309127.

Signed and Sealed this

Twenty-third Day of July 1985

[SEAL]

*Attest:*

DONALD J. QUIGG

*Attesting Officer*     *Acting Commissioner of Patents and Trademarks*